United States Patent
Wilkinson et al.

(10) Patent No.: US 10,007,547 B2
(45) Date of Patent: Jun. 26, 2018

(54) SPECIFYING AN INVOCATION ORDER OF A PLURALITY OF RESOURCES IN A TRANSACTION ACCORDING TO RESOURCE DISTANCE

(75) Inventors: Andrew Wilkinson, Bishops Waltham (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1970 days.

(21) Appl. No.: 12/355,469

(22) Filed: Jan. 16, 2009

(65) Prior Publication Data

US 2009/0187913 A1    Jul. 23, 2009

(30) Foreign Application Priority Data

Jan. 17, 2008  (EP) .................................... 08150366

(51) Int. Cl.
  *G06F 9/46*  (2006.01)
  *G06F 17/30*  (2006.01)
(52) U.S. Cl.
  CPC ........ *G06F 9/466* (2013.01); *G06F 17/30227* (2013.01); *G06F 17/30377* (2013.01)
(58) Field of Classification Search
  CPC .............. G06F 9/466; G06F 17/30227; G06F 17/30377
  See application file for complete search history.

(56) References Cited

U.S. PATENT DOCUMENTS

| | | | |
|---|---|---|---|
| 5,261,089 A * | 11/1993 | Coleman et al. | |
| 5,335,343 A | 8/1994 | Lampson et al. | |
| 5,363,121 A * | 11/1994 | Freund | ........................ 718/101 |
| 5,504,899 A * | 4/1996 | Raz | |
| 5,561,797 A * | 10/1996 | Gilles et al. | |
| 5,781,910 A | 7/1998 | Gostanian et al. | |
| 5,953,719 A | 9/1999 | Kleewein et al. | |
| 5,960,436 A * | 9/1999 | Chang | .................... G06F 9/466 |
| 6,061,708 A | 5/2000 | McKeehan et al. | |
| 6,799,188 B2 | 9/2004 | Weedon | |
| 7,712,096 B2 * | 5/2010 | Kaczynski et al. | ........... 718/101 |
| 2002/0133507 A1 * | 9/2002 | Holenstein | .......... G06F 11/2064 |
| 2003/0046298 A1 | 3/2003 | Weedon | |
| 2004/0068501 A1 * | 4/2004 | McGoveran | ..................... 707/8 |

(Continued)

OTHER PUBLICATIONS

Samaras et al., "Two-Phase Commit Optimizations and Tradeoffs in the Commercial Environment", IEEE, 1993, pp. 520-529.*

(Continued)

*Primary Examiner* — David J. Huisman
(74) *Attorney, Agent, or Firm* — The Steadman Law Firm PLLC

(57) ABSTRACT

A method of ordering multiple resources in a transaction includes receiving a transaction for a plurality of resources and determining, for each resource, the work embodied by the transaction. The method further may include specifying an order of the resources according to the determination of the work, committing the transaction, and invoking the resources in the specified order. Specifying the order of the resources may include specifying the resource to be invoked last. Alternatively, or additionally, specifying the order of the resources also may include specifying that each resource carrying out read-only work be invoked first.

20 Claims, 6 Drawing Sheets

(56) References Cited

U.S. PATENT DOCUMENTS

2006/0136887 A1* 6/2006 Kaczynski et al. ........... 717/151

OTHER PUBLICATIONS

Little et al., "ArjuanaCore Development Guide—TxCore and TXOJ Programmer's Guide", Chapter 4, Feb. 1, 2001, pp. 1-6.*
IONA Technologies PLC, "IONA Orbix 2000 OTS Programmers Guide C++ Edition", Aug. 2001, 174 pages. (pp. 99-108 are particularly relevant).*
Samaras et al., "Two-Phase Commit Optimizations and Tradeoffs in the Commercial Environment", 1993, pp. 520-529.*
Oracle, "Containers for J2EE Services Guide—Chapter 5: OC4J Transaction Support", Apr. 1, 2008, 14 pages.*
"Two Phase Commit", Feb. 17, 2007, 2 pages.*

* cited by examiner

SPECIFYING AN INVOCATION ORDER OF A PLURALITY OF RESOURCES IN A TRANSACTION ACCORDING TO RESOURCE DISTANCE

CROSS-REFERENCE TO RELATED APPLICATION

This application claims the benefit of EP Patent Application 08150366.6, filed on Jan. 17, 2008, which is incorporated by reference herein in its entirety.

FIELD OF THE INVENTION

This invention relates to a method of, and system for, ordering multiple resources. The invention, in one embodiment, provides the automatic ordering of transaction resources during two-phase commit processing to maximize occurrences of a one-phase commit optimization and minimize the cost of two-phase commit.

BACKGROUND OF THE INVENTION

In many examples of networks composed of servers, computers and/or databases, an algorithm known as the two-phase commit protocol is used. This protocol is a distributed algorithm that requires that all resources in a distributed system agree to commit a transaction, before the transaction is committed. This means that the protocol will result in either all resources committing the transaction or all resources aborting the transaction, even in the case of network failures or node failures. The two phases of the algorithm are, firstly, the prepare phase, in which a transaction manager attempts to prepare all the transaction resources, and the commit phase, in which the transaction manager completes the transactions at all resources. For more detail on the operation of the two-phase commit protocol, see, for example, "Transaction Processing: Concepts and Techniques" by Jim Gray and Andreas Reuter (ISBN 1-55860-190-2).

Completing a transaction using the two-phase commit protocol is a relatively expensive exercise in terms of performance as, when more than one resource is interested in the outcome of the transaction, information concerning the resources involved and the transaction's outcome must be stored persistently, typically by writing data to disk, to ensure that the outcome of the transaction is preserved across a system failure. Furthermore, information must also be persistently stored by each resource manager involved in the transaction. Due to the expense of this logging, it is desirable, where possible, to avoid doing so.

As mentioned above, the first part of the two-phase commit protocol is the prepare phase. During prepare processing, each resource in the transaction is asked to vote on the transaction's outcome. A resource may vote to commit the transaction, vote to roll the transaction back, or vote read-only, i.e. the work done via that resource was read-only and as such it has no further interest in the transaction's outcome. When a resource is prepared and the resource votes to commit the transaction, the resource manager must store information regarding the transaction persistently such that, in the event of a failure, it ensures that it completes the transaction in the same direction as every other resource which was involved.

A relatively common scenario is one where there are two resources involved in a transaction: resource A, which has been used to perform a write, e.g., inserting a row into a table in a database; and resource B, which has only been used to perform a read. The order in which these resources are processed affects whether or not any logging is performed: For example, if Resource A goes first:

1. Transaction commit processing begins.
2. There are two resources interested in the transaction's outcome so two-phase commit processing is required.
3. Resource A is instructed to prepare.
4. A write has been performed. The resource manager persists information about the transaction and votes to commit the transaction.
5. There are still two resources interested in the transaction's outcome, continue with prepare processing.
6. Resource B is instructed to prepare.
7. A read has been performed. No logging is required and the resource votes read-only.
8. There is one resource interested in the transaction's outcome that has been prepared. The transaction manager persists information about the resource involved and then directs it to commit.

In the reverse situation, when Resource B goes first:

1. Transaction commit processing begins.
2. There are two resources interested in the transaction's outcome so two-phase commit processing is required.
3. Resource B is instructed to prepare.
4. A read has been performed. The resource manager releases its read locks and votes read only. Note, it has not had to persist any information about the transaction.
5. Resource B has indicated that the resource is no longer interested in the transaction's outcome leaving only a single resource.
6. Resource A is instructed to perform a one-phase commit optimization.

The second scenario (when resource B goes first) significantly outperforms the first scenario, as no logging is required by either the transaction coordinator or either of the resource managers in this case, and fewer calls are made to the resource managers: one prepare and one commit call versus two prepare calls and one commit call, in the first scenario. For performance reasons it is therefore desirable for the resources to be committed in the order described in the second scenario above, however this is difficult to achieve.

Some transaction coordinators make no attempt to order the resources and typically simply commit them in the order in which they were enlisted. This approach has the disadvantage that it offers no guarantees that the read-only resource will be processed first. Another known solution is to allow an application developer to specify an ordering priority at application development or deployment time which is used to order the resources during commit processing. This has the disadvantage that the nature of the work to be performed with each resource manager must be known in advance and must not change depending on the application's logic.

Another solution is to perform a three-phase commit where the first phase is to ask each resource for their anticipated prepare vote. Whilst this vote may change, it can be used to then order the prepare processing such that any resources that have indicated that they anticipate responding with read only are processed first. This solution has the disadvantage that it introduces additional communication flows with the resource managers involved in the transaction.

Another improved two-phase commit is described in United States of America Patent Application Publication US 2003/0046298, which describes a transaction processing system providing an improved methodology for two-phase commit decision. In this document, a transaction processing system providing improved methodology for invoking two-phase commit protocol is described. More particularly, a transaction is handled without the use of the two-phase commit protocol, until the system determines that the transaction does, in fact, involve changes to more than one database. The methodology improves overall system performance by looking at each transaction to determine whether the transaction actually requires use of the two-phase commit protocol, before incurring the overhead associated with use of the two-phase commit protocol. Because only a small percentage of real world transactions result in updates to more than one database, the methodology improves the overall performance of transaction processing systems considerably. However, the optimization provided by a system as described in US 2003/0046298 has no value in relation to a system receiving a transaction that relates a plurality of resources. It is therefore an object of the invention to improve upon the known art.

SUMMARY OF THE INVENTION

According to a first aspect of the present invention, there is provided a method of ordering multiple resources in a transaction. The method comprises receiving a transaction for a plurality of resources; determining, for each resource, the work embodied by the transaction; ordering the resources according to the determination of the work; committing the transaction; and invoking the resources in the selected order.

According to a second aspect of the present invention, there is provided a system for ordering multiple resources in a transaction comprising a transaction manager and a plurality of resources. The system can be arranged to receive a transaction for a plurality of resources; determine, for each resource, the work embodied by the transaction; order the resources according to the determination of the work; commit the transaction; and to invoke the resources in the selected order.

According to a third aspect of the present invention, there is provided a computer program product on a computer readable medium for ordering multiple resources in a transaction. The product comprises instructions for receiving a transaction for a plurality of resources; determining, for each resource, the work embodied by the transaction; ordering the resources according to the determination of the work; committing the transaction; and invoking the resources in the selected order.

Owing to the invention, it is possible to automatically order the resources involved in a transaction immediately prior to commencing two-phase commit processing, based on the nature of the work which those resources have performed in the transaction and/or the cost of preparing the resources. The work embodied by the transaction, for a specific resource, may be the nature of the operation for a specific resource (such as whether it is a read operation or a write operation), or may be some identified parameter relating to the operation for the specific resource (such as how distant the resource is and therefore how much latency is present).

Preferably, the step of ordering the resources comprises specifying that each resource carrying out read-only work is invoked first. Resources which are identified as having only to perform read operations would be processed before any resource that is to perform write operations thereby maximizing the possibility that the above-described one-phase commit optimization will be possible. This solution has the advantages that the nature of the work that is to be performed with each resource does not need to be known in advance and that it can change depending on the application's logic and yet a one-phase commit optimization will still be performed wherever possible.

The key to the invention is determining the nature of the work done by a resource in a transaction at runtime and providing that information to the transaction coordinator such that it can order the resources prior to commencing the two-phase commit process so that the resources which can more quickly perform their prepare processing can be ordered before those which need more processing or time to perform their prepare logic.

Advantageously, the step of ordering the resources preferably comprises specifying the resource to be invoked last. The ordering of the resources need not be a wholesale re-arrangement of the order in which the resources are invoked. For example, the ordering may simply take an identified resource and place that resource last in the order. This resource may be specifically identified as having a characteristic (such as being a write operation) that should be carried out last, or may relate to a determined parameter about the resource (such as it being the most distant resource).

Ideally, the step of determining, for each resource, the work embodied by the transaction, comprises parsing a call to each resource. Additionally, the step of determining, for each resource, the work embodied by the transaction, may include, following parsing of the call to each resource, determining whether the respective call is read-only. This feature provides a simple solution to the identification of the nature of the operation for a specific resource.

BRIEF DESCRIPTION OF THE DRAWINGS

The present invention will now be described, by way of example only, with reference to preferred embodiments thereof, as illustrated in the accompanying drawings. It is expressly noted, however, that the invention is not limited to the precise arrangements and instrumentalities shown.

DETAILED DESCRIPTION

Figure 1:
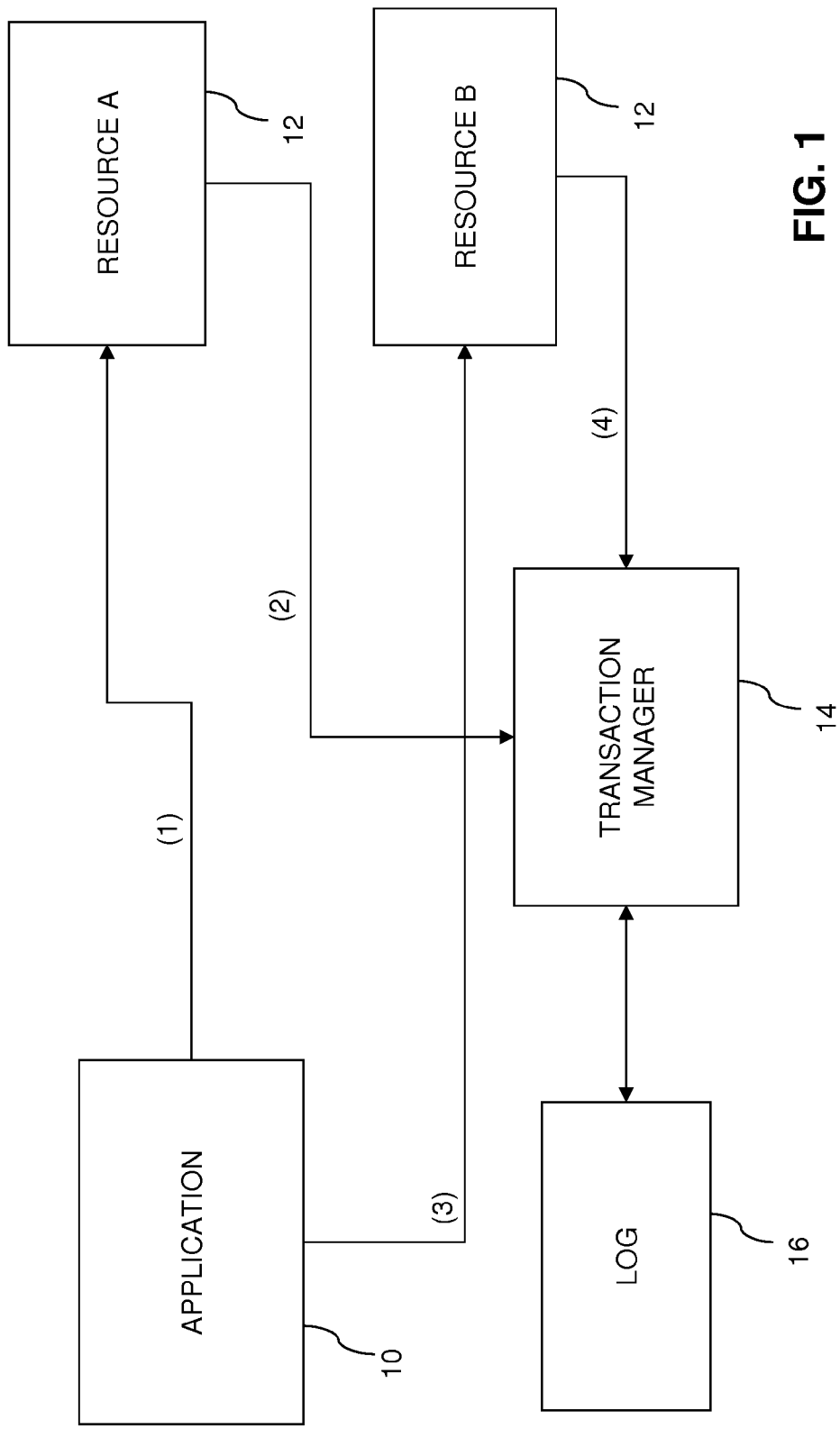
FIGS. 1 and 2 are schematic diagrams of a system.
Figure 2:
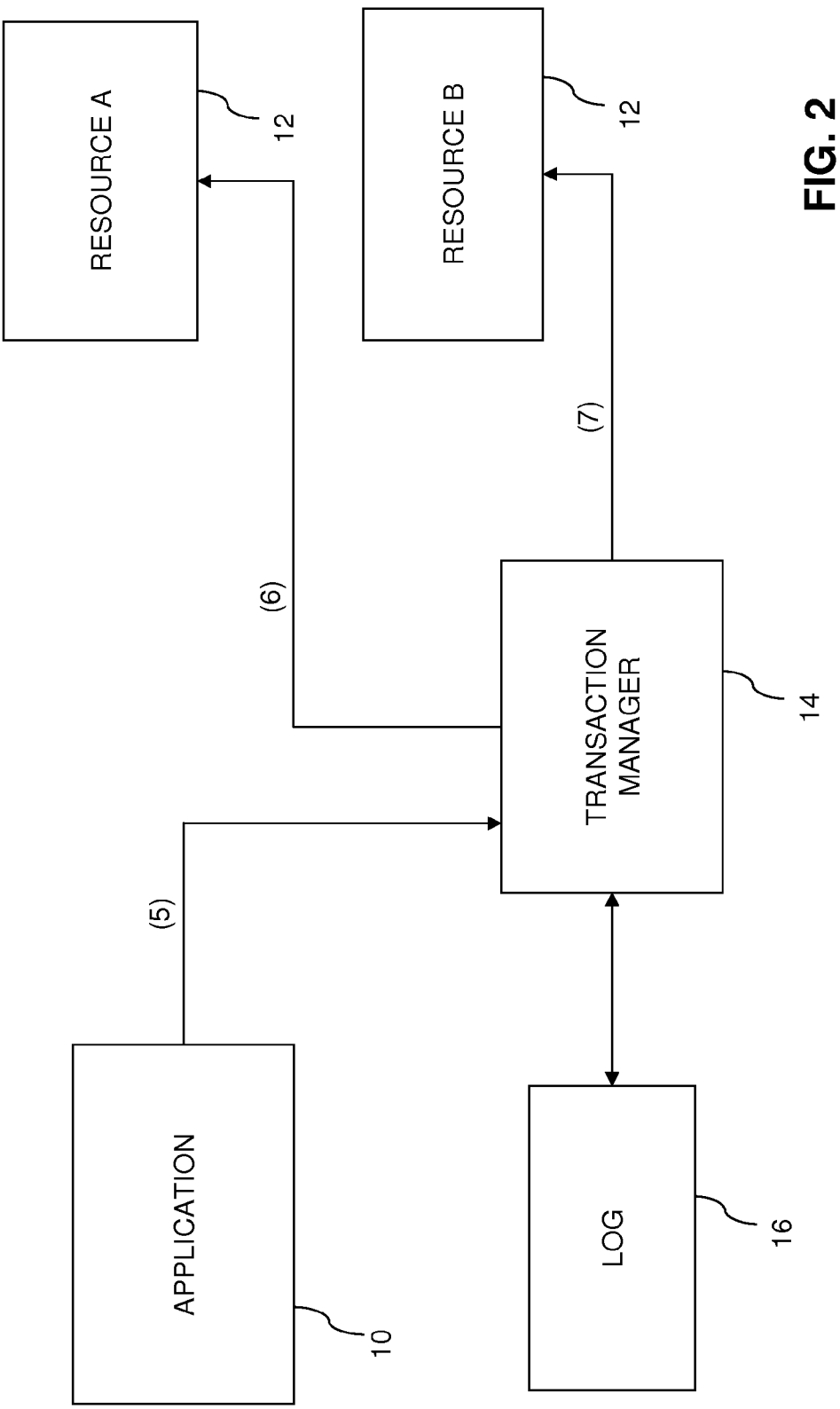

FIGS. 1 and 2 show a system comprising an application 10, resources 12, a transaction manager 14, and a log 16. This system is a distributed network of computing devices such as servers and databases that are connected together by one or more networks such as the Internet and/or local networks. Messages flow between the components of the system.

The numbers on the Figures show the sequence of calls between the various components, as would occur in a situation where the application 10 will need to carry out a transaction that relates to two resources 12, resource A and resource B. Initially, the application 10 gets the resources 12 involved in the transactions (calls 1 and 3). These, in turn, register themselves with the transaction manager 14, which indicates that the resources 12 are now involved in the transaction (calls 2 and 4). The Log 16 (which is used by the transaction manager 14 to record what happens with the transaction), may need to be involved.

The next stage of the process is shown in FIG. 2. The application 10, after preparing the resources 12, then instructs the transaction manager 14 to commit the transaction (call 5). To do this, the transaction manager 14 needs to perform the standard two-phase protocol by invoking the resources again (calls 6 and 7) as shown in more detail in FIG. 3.

Figure 3:
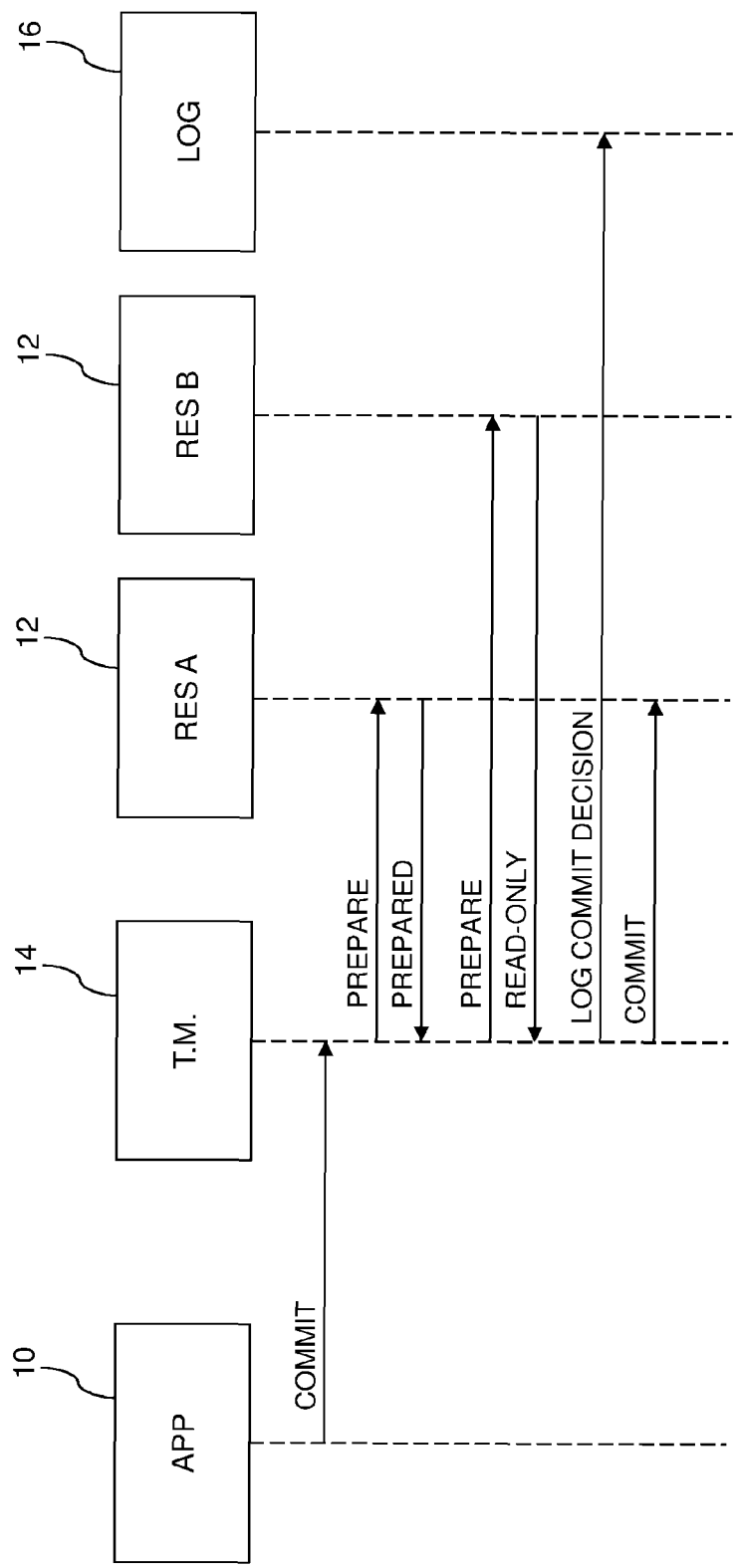
FIG. 3 is a schematic diagram of prior art processing in the system of FIGS. 1 and 2.

FIG. 3 shows in more detail the commit processing performed by transaction manager 14. This example has the two resources (resource A and resource B) involved in the transaction. There are changes that need to be committed in resource A, but resource B has no changes (the data stored by resource B, in this example, is only consulted by the application). If the transaction manager 14 checks the resources 12 in the order resource A followed by resource B, then the transaction manager 14 will have to perform a second phase and re-invoke resource A with the commit. Note that in the Figure there is shown a call to the log 16 to store the commit decision. In this specific scenario, this call can be optimized out of the flow as it is not needed, but the second call to resource A is required.

In general, the transaction manager 14 prepares the resources 12 in the order in which the transaction manager 14 is made aware of their existence. In the example of FIGS. 1 to 3, the message flow from the application 10 resulted in the resources 12 contacting the transaction manager 14 in the order of resource A followed by resource B. This then means that the non-optimal sequence of calls of FIG. 3 is used by the transaction manager 14. Particularly when there are a large number of resources 12 involved in a transaction, then the likelihood of the application 10 contacting the resources in an order that is non-optimal is very high. Obviously, in the example of FIGS. 1 to 3, there is a 50/50 chance that the most optimal ordering will be selected by chance, but this ratio reduces rapidly for each additional resource that is present in the transaction.

Figure 4:
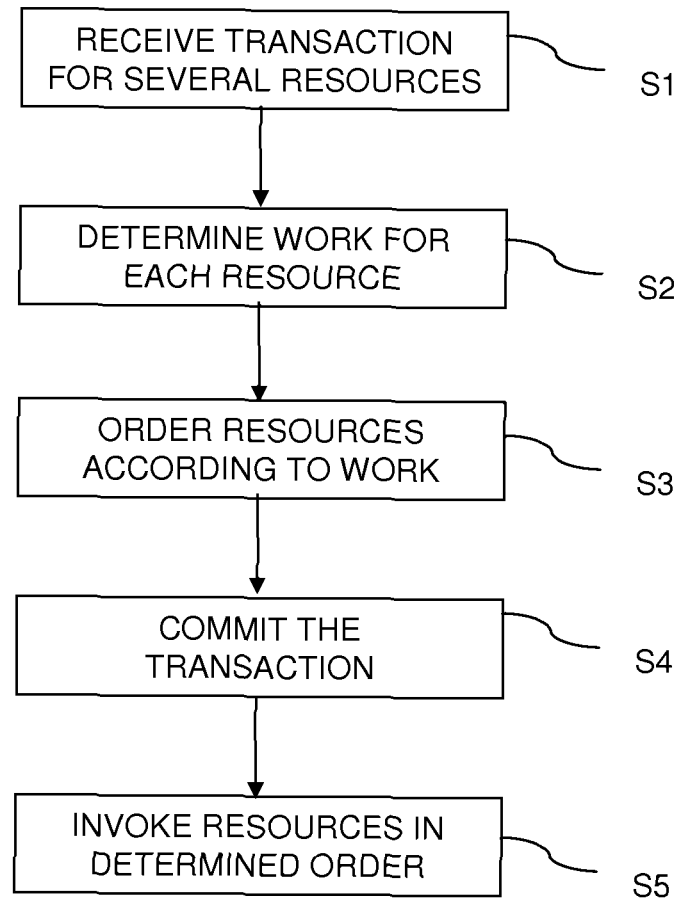
FIG. 4 is a flowchart of a method of operating the system of FIGS. 1 and 2.

FIG. 4 presents an inventive improvement to the known method of handling transactions such as described in FIGS. 1 to 3. The method of ordering the multiple resources 12 in the transaction comprises, firstly at step S1, receiving the transaction for the plurality of resources 12. Once the transaction is received and acted upon by the application 10 (informing each resource to contact the transaction manager 14), then there is carried out, at step S2 the determining, for each resource 12, the work embodied by the transaction. The work embodied by the transaction may be in the sense of the actual content of the task that the resource 12 will carry out, such as whether it is a read or write instruction, or may be the work involved in carrying out the task, such as the number of instructions or the distance to the specific resource.

Once this step has been completed by the transaction manager 14, then the next step in the process is the step S3 of ordering the resources 12 according to the determination of the work. The ordering of the resources may comprise specifying the resource 12 to be invoked last, for example. The ordering of the resources 12 may also (in addition or alternatively) comprise specifying that each resource 12 carrying out read-only work be invoked first.

The ordering step is designed to re-arrange the default ordering of the transaction manager 14 (which will be based upon the order in which the resources 12 identified themselves to the transaction manager 14) to produce an order that, when the transaction is invoked, will be the most efficient. In the simple case of a transaction that includes a read operation and a write operation, this will mean that the read operation is performed first and the write operation is performed last. This will reduce the time that the transaction takes to complete and will reduce the number of calls that are created within the system. No modification of the application 10 is required to achieve this, merely some modification to the processing carried out by the transaction manager 14. After the ordering is completed, then at step S4 the application 10 instructs the committing of the transaction, and at step S5 the transaction manager 14 thereby invokes, the resources 12 in the order determined by the ordering step.

The step of determining, for each resource 12, the work embodied by the transaction, may comprise parsing a call to each resource 12. In this case, the step of determining, for each resource 12, the work embodied by the transaction, also includes, following parsing of the call to each resource 12, determining whether the respective call is read-only. This provides a method by which the transaction manager 14 can process the calls to the resources 12 to determine the nature of the work.

Figure 5:
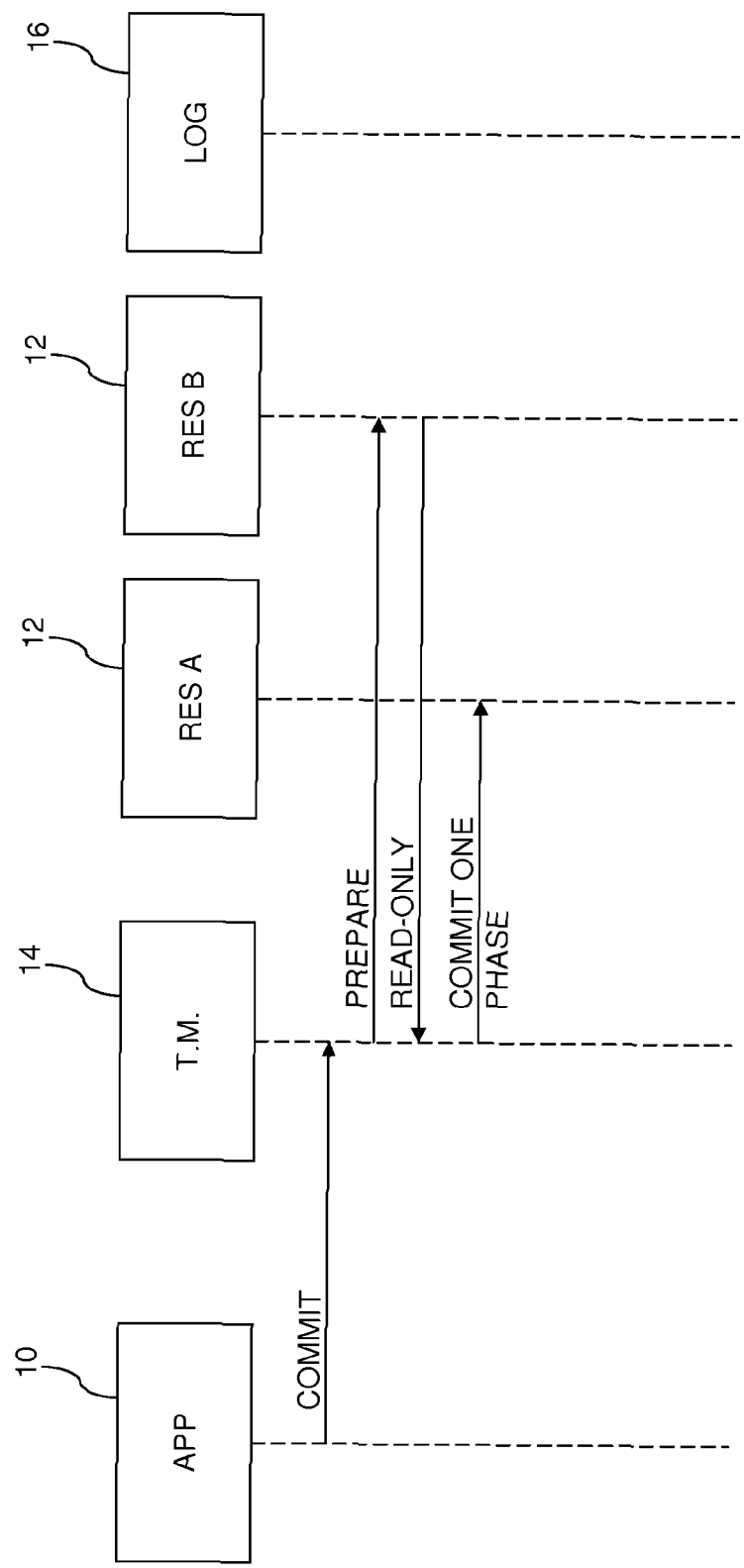
FIG. 5 is a schematic diagram of novel processing in the system of FIGS. 1 and 2.

FIG. 5 shows the resources 12 being called in the order resource B followed by resource A. The transaction manager 14 has determined that the resources should be ordered in this way, and following the commit from the application 10 (analogous to step S4 of FIG. 4), resource A can be invoked with the "commit-one-phase" which instructs resource A to commit the resource 12 in a single phase (the standard two phase algorithm not being required). The system is basically delivering a mechanism by which the transaction manager 14 can determine that this is the preferred ordering, and the number of calls required to carry out the transaction is reduced.

One of the most common two-phase-commit-capable resources is a database where work is typically performed using SQL. SQL queries typically perform one of four operations, a SELECT, an UPDATE, an INSERT, or a CREATE. Of these four, the first is a read-only operation, with the remaining three being, or having the potential to be, write operations.

In a relatively simple embodiment of the system, SQL calls that are made to the database could be subjected to some rudimentary parsing to determine whether or not the call is read-only. A call could be identified as read-only in the absence of the UPDATE, INSERT, or CREATE SQL keywords. The nature of the SQL work performed, i.e. whether read or write, would then be encapsulated within the resource 12 enlisted in the transaction. At commit time, the transaction manager 14 would order the resources 12 using the encapsulated read or write data to ensure that any read-only resources 12 were processed first.

With the growing popularity of tools that auto-generate SQL queries such as Hibernate, OpenJPA, and CMP entity Java™ Enterprise Beans, a more sophisticated embodiment of the system could collaborate with such a tool to improve the read-only determination. As the tool itself is generating the SQL, the tool will have sufficient knowledge of that SQL to know whether or not it is only performing read operations without having to resort to parsing the SQL. This would most likely improve performance in comparison to a system which parsed the SQL query. (Java and all Java-based trademarks are trademarks of Sun Microsystems, Inc. in the United States, other countries, or both.)

Figure 6:
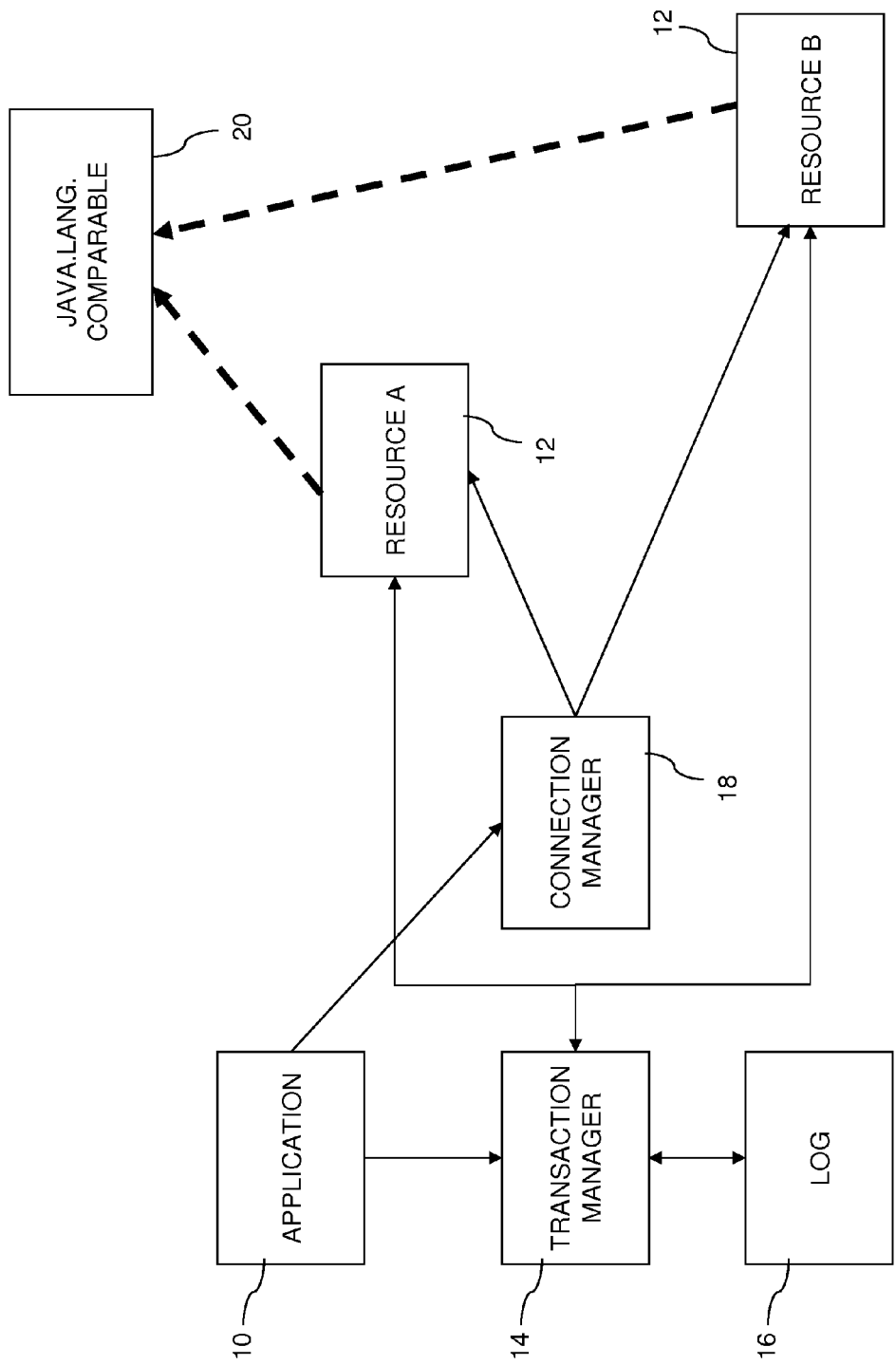
FIG. 6 is a schematic diagram of a second embodiment of the system.

A Java and JEE-based embodiment of the system, shown in FIG. 6, would involve collaboration between the transaction manager 14 and a connection manager 18. When work is first performed using a connection provided by the connection manager 18, a resource 12 representing the connection is enlisted with the current transaction. To facilitate ordering of the resources 12 enlisted in the transaction this resource 12 would implement the java.lang.Comparable interface 20. As work is performed on a connection the work would be analyzed to determine whether or not it was read-only, with the connection's resource being used to store the result, e.g. by setting a readOnly flag to true. When commit processing begins the transaction service would sort its list of enlisted resources through use of the compareTo method, provided by the Comparable interface 20. Those that were read-only would be sorted into a position at the head of the list such that they were processed first. Any resource not implementing the Comparable interface 20 would be assumed to perform a write operation and placed after any read only resources 12.

A further embodiment of the system would extend the comparison to determine whether one of the resources 12 being compared is "local" (i.e. no network traffic needed to perform prepare logic) and the other "remote". The local resource 12 can then be ordered before the remote resource 12. This ordering by cost of calling ensures that, in the event of a rollback vote being received and the prepare phase abandoned, as little time will have been wasted as possible as those resources 12 whose prepare phase is most expensive will not have been called.

The invention can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is appropriate. A typical combination of hardware and software can be a general purpose computer system with a computer program that, when being loaded and executed, controls the computer system such that it carries out the methods described herein.

The invention can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

We claim:

1. A computer-based method comprising:
  receiving a transaction for a plurality of resources;
  determining, for each resource of the plurality of resources, work embodied by the transaction by parsing a call to the resource, wherein the call to the resource is a direct communication to the resource from an application associated with the transaction, wherein the determining is performed by a processor, and wherein the work comprises at least one identified parameter relating to an operation for the resource, including a distance of the resource in the context of the transaction;
  specifying, by the processor, an order of the plurality of resources according to respective distances of the plurality of resources in the context of the transaction;
  upon specifying the order of the plurality of resources, committing the transaction from the application to a transaction manager; and
  upon committing the transaction, invoking each of the plurality of resources in the specified order.

2. The method of claim 1, wherein specifying the order of the plurality of resources comprises specifying a resource of the plurality of resources to be invoked last.

3. The method of claim 1, wherein determining, for each resource of the plurality of resources, the work embodied by the transaction includes, following parsing of the call to the resource, determining whether the call is read-only.

4. The method of claim 1, wherein specifying the order of the plurality of resources comprises specifying that a resource of the plurality of resources that is local with respect to an associated system be ordered before a resource of the plurality of resources that is remote with respect to the associated system.

5. The method of claim 1, wherein the distance of the resource indicates latency with respect to the resource.

6. The method of claim 1, wherein specifying the order of the plurality of resources comprises specifying that a resource among the plurality of resources that is most distant be ordered last.

7. The method of claim 1, wherein committing the transaction comprises persistently storing information regarding an outcome of the transaction.

8. A computer-based system comprising:
  a processor configured to:
    receive a transaction for a plurality of resources;
    determine, for each resource of the plurality of resources, work embodied by the transaction by parsing a call to the resource, wherein the call to the resource is a direct communication to the resource from an application associated with the transaction, and wherein the work comprises at least one identified parameter relating to an operation for the resource, including a distance of the resource in the context of the transaction;
    specify an order of the plurality of resources according to respective distances of the plurality of resources in the context of the transaction;
    upon specifying the order of the plurality of resources, commit the transaction from the application to a transaction manager; and
    upon committing the transaction, invoke each of the plurality of resources in the specified order.

9. The system of claim 8, wherein the processor, when specifying the order of the plurality of resources, is configured to specify a resource of the plurality of resources to be invoked last.

10. The system of claim 8, wherein the processor, when specifying the order of the plurality of resources, is configured to specify that a resource of the plurality of resources that is local with respect to the system be ordered before a resource of the plurality of resources that is remote with respect to the system.

11. The system of claim 8, wherein the distance of the resource indicates latency with respect to the resource.

12. The system of claim 8, wherein the processor, when specifying the order of the plurality of resources, is configured to specify that a resource among the plurality of resources that is most distant be ordered last.

13. The system of claim 8, wherein committing the transaction comprises persistently storing information regarding an outcome of the transaction.

14. A computer program product on a non-transitory computer-readable medium, the product comprising computer-readable instructions, which, when loaded in and executed by a computer, cause the computer to perform steps of:
   receiving a transaction for a plurality of resources;
   determining, for each resource of the plurality of resources, work embodied by the transaction by parsing a call to the resource, wherein the call to the resource is a direct communication to the resource from an application associated with the transaction, and wherein the work comprises at least one identified parameter relating to an operation for the resource, including a distance of the resource in the context of the transaction;
   specifying an order of the plurality of resources according to respective distances of the plurality of resources in the context of the transaction;
   upon specifying the order of the plurality of resources, committing the transaction from the application to a transaction manager; and
   upon committing the transaction, invoking each of the plurality of resources in the specified order.

15. The computer program product of claim 14, wherein specifying the order of the plurality of resources comprises specifying a resource of the plurality of resources to be invoked last.

16. The computer program product of claim 14, wherein determining, for each resource of the plurality of resources, the work embodied by the transaction includes, following parsing of the call to the resource, determining whether the call is read-only.

17. The computer program product of claim 14, wherein specifying the order of the plurality of resources comprises specifying that a resource of the plurality of resources that is local with respect to an associated system be ordered before a resource of the plurality of resources that is remote with respect to the associated system.

18. The computer program product of claim 14, wherein the distance of the resource indicates latency with respect to the resource.

19. The computer program product of claim 14, wherein specifying the order of the plurality of resources comprises specifying that a resource among the plurality of resources that is most distant be ordered last.

20. The computer program product of claim 14, wherein committing the transaction comprises persistently storing information regarding an outcome of the transaction.

* * * * *